United States Patent [19]

Sieren et al.

[11] 4,042,053
[45] Aug. 16, 1977

[54] FOUR-WHEEL DRIVE TRACTOR

[75] Inventors: Gerald E. Sieren, Greendale, Wis.; Earl C. Musser, Madison, Ind.

[73] Assignee: Allis-Chalmers Corporation, Milwaukee, Wis.

[21] Appl. No.: 602,840

[22] Filed: Aug. 7, 1975

Related U.S. Application Data

[63] Continuation-in-part of Ser. No. 536,089, Dec. 24, 1974, abandoned.

[51] Int. Cl.² .................. B60D 1/14; B60K 17/30; B60K 17/32
[52] U.S. Cl. .................. 180/51; 180/135; 280/496
[58] Field of Search .................. 180/51, 42, 45, 49, 180/79.2 B, 79.2 C, 44 R, 134, 135; 280/496, 456 A, 460 A, 490 A, 408, 400

[56] References Cited

U.S. PATENT DOCUMENTS

| 1,414,770 | 5/1922 | Blain | 280/496 X |
|---|---|---|---|
| 1,577,402 | 3/1926 | Wray et al. | 280/496 |
| 2,865,657 | 12/1958 | Clarke | 280/460 A |
| 3,380,547 | 4/1968 | Granryd | 180/135 |
| 3,414,072 | 12/1968 | Hodges | 180/79.2 B |
| 3,515,235 | 6/1970 | Kamner | 180/135 |
| 3,527,315 | 9/1970 | Hampton | 180/51 |
| 3,618,982 | 11/1971 | Moore | 280/408 |
| 3,690,395 | 9/1972 | Spiller | 280/408 |
| 3,704,754 | 12/1972 | Layton | 180/79.2 B |
| 3,771,241 | 11/1973 | Lindell et al. | 180/79.2 B |
| 3,851,895 | 12/1974 | Davis | 280/467 |

Primary Examiner—Joseph F. Peters, Jr.
Assistant Examiner—Jack D. Rubenstein
Attorney, Agent, or Firm—Arthur L. Nelson

[57] ABSTRACT

A four-wheel drive tractor with front-wheel steering on the front axle and rear-wheel articulated steering to provide maximum traction, stability, and maneuverability. The front axle pivots on a pivot longitudinal with the vehicle body and the front wheels pivot relative to the axle to steer the front end of the vehicle. The articulated vehicle bearings are positioned near the rear axle to provide a long front frame supporting portion for the operator station of the vehicle and to improve stability of the vehicle when the vehicle is articulated.

12 Claims, 13 Drawing Figures

FOUR-WHEEL DRIVE TRACTOR

This patent application is a continuation-in-part application of patent application Ser. No. 536,089, Four-Wheel Drive Articulated Tractor, G. E. Sieren and E. C. Musser, filed Dec. 24, 1974, now abandoned.

This invention relates to a four-wheel drive tractor and more particularly to an articulated vehicle having articulated steering on the rear wheels and having front-wheel steering for steering the front wheels relative to a pivoting front axle.

The conventional vehicle, such as an automobile, employs a rear-wheel drive and a front-wheel steer with a single main chassis. This type of operation has been used quite extensively in the tractors as well. With an increase in size of engines in the tractor-type vehicles, and the advent of the four-wheel drive wherein the front and rear wheels are essentially the same size, the articulated vehicle has been looked on more favorably. Various types of articulating joints have been used for pivotal relative movement on a horizontal and a vertical axis. Although the conventional articulated vehicle is pivoted on a vertical axis, some means must be provided for oscillation of the one axle relative to the other due to the unevenness in the terrain. The type of pivoting mechanism on the front axle and the pivot for the articulation of the vehicle is critical since this does affect the stability of the vehicle. An articulation of the vehicles having the articulating joint of the vehicle centrally located between the front and rear wheels will cause instability particularly on uphill turns because the center of gravity is shifted outside the center line of the vehicle. Large angles of articulation reduce the tractive effort of the tractor as well as drawbar pull since the wheels work in opposition to each other. This interaction consumes extra power without productive work being done. Accordingly, this invention is intended to overcome this instability and inefficiency, and to provide greater maneuverability and improved traction for the vehicle.

Accordingly, this invention provides for a four-wheel drive vehicle with articulation between the front and rear frames of the vehicle chassis. The articulation point is approximately in the ratio of 3 to 1 between the front and rear frames of the vehicle chassis. For example, a vehicle with an 110-inch wheel base would have a front frame of approximately 83 inches from the pivot center to the front axle center line and a rear frame of 27 inches from the pivot to the rear axle center line. The rear wheels are steered by articulation of the vehicle. The front wheels are mounted on a pivotal axle pivotally mounted under the front frame of the chassis. The front wheels are steerable on axes defined by the pivotal connections between the wheel support and the front axle. Accordingly, the vehicle can be steered as a conventional single-frame chassis or as the combined front-wheel steering and articulated steering of the rear wheels for left or right turns or crab steering. This in turn will provide conventional steering, such as the single-framed front-wheel steering-type mechanism or articulated steering or a combination of either of these two types of steering, to reduce the angularity between the center line of the front frame and the center line of the rear frame with the line of draft of the vehicle if a tractor or line thrust if a bulldozer or front-end loader vehicle. This provides greater stability because the center of gravity is maintained in a more central location on the vehicle. The steerability of the front wheels relative to the front axle together with articulated rear-wheel steering provides greater maneuverability of the vehicle and less side thrust on a rear-end coupled implement during corrective steering or during turning. The constant pull on the implement is not momentarily interrupted or reduced by corrective steering as is experienced by center-articulated steering due to interaction between the front and rear wheels.

It is an object of this invention to provide a four-wheel drive tractor with steerable front wheels on a front axle and articulated steering for the rear wheels of the tractor to provide left-turn or right-turn steering and crab steering for the vehicle.

It is another object of this invention to provide a pivotal front axle with steerable wheels on the axle and an articulated chassis with the front frame being substantially longer than the rear frame on the vehicle.

It is a further object of this invention to provide a four-wheel drive tractor with steerable front wheels and an articulated chassis with articulated rear-wheel steering to reduce the angularity between the longitudinal center lines of the front and rear frames with the line of draft or forward thrust of the vehicle while turning.

It is a further object of this invention to provide a four-wheel drive vehicle with steerable front wheels on a pivotal front axle and articulated vehicle rear-wheel steering to provide a three-point hitching arrangement to avoid implement engagement with the rear wheels or excessive side thrust on the implement when turning.

It is a further object of this invention to provide an articulated vehicle having articulated rear-wheel steering and a pivotal front axle with steerable front wheels steerable about essentially vertical pivotal axes to increase the maneuverability and stability of the vehicle.

It is a further object of this invention to provide a four-wheel drive tractor having an articulated chassis with a pivotal front axle having steerable wheels and articulated steering on the rear wheels with a long front bogie for supporting the operator station and a short rear bogie to increase stability and maneuverability of the vehicle during articulation and steering of the vehicle.

It is a further object of this invention to provide a four-wheel drive tractor with steerable front wheels and articulated rear-wheel steering having a line of draft which if projected forward would always lie between the front wheels.

The ojects of this invention are accomplished by providing a four-wheel drive vehicle. The vehicle chassis includes a front frame and a rear frame with articulation rearwardly of the center of the vehicle chassis with a ratio of about 3 to 1. The rear axle is supported on the rear wheels and the steering of the rear wheels is controlled by hydraulic actuators in connection with the articulated joint of the vehicle chassis.

The front axle of the vehicle pivotally supports the front frame and allows for the pivoting of the front axle in response to the unevenness of the terrain. The front wheels are steerable on the axle and are steered hydraulically in response to the hydraulic controls by the operator. The drive for the front and rear wheels may be a mechanical drive through universal joints running fore and aft from a transmission drop box centrally located on the vehicle chassis and supported on the front frame. The articulated joint on the vehicle chassis pivots on a top and lower bearing to maintain the upright position of the front frame while the rear wheels maintain the stability and position of the front and rear frames. Since the front axle is pivotal relative to the front frame, this does not control the position of the front frame, but merely allows for the front wheels to follow the terrain and maintain traction while the vehicle is in operation. With the front-wheel steering and the articulated steering of the rear wheels, the steerable angle of the articulated joint can be substantially reduced and, accordingly, the longitudinal center lines of the front and rear frames are more parallel with the line of travel and the stability of the tractor and maneuverability of the tractor is improved.

Referring to the drawings, the preferred embodiment of this invention is illustrated:

FIG. 10 is a side elevation view of FIG. 9;

FIG. 11 is a modification of the vehicle shown in FIG. 10 with the pivotal connection for the drawbar on the front frame only;

FIG. 12 is a plan view of a schematic illustration of an articulated vehicle with the drawbar connected to the front frame; and, FIG. 13 is a plan view of a schematic illustration for an articulated vehicle with an articulated joint midway between the front and rear axles.

Figure 1:
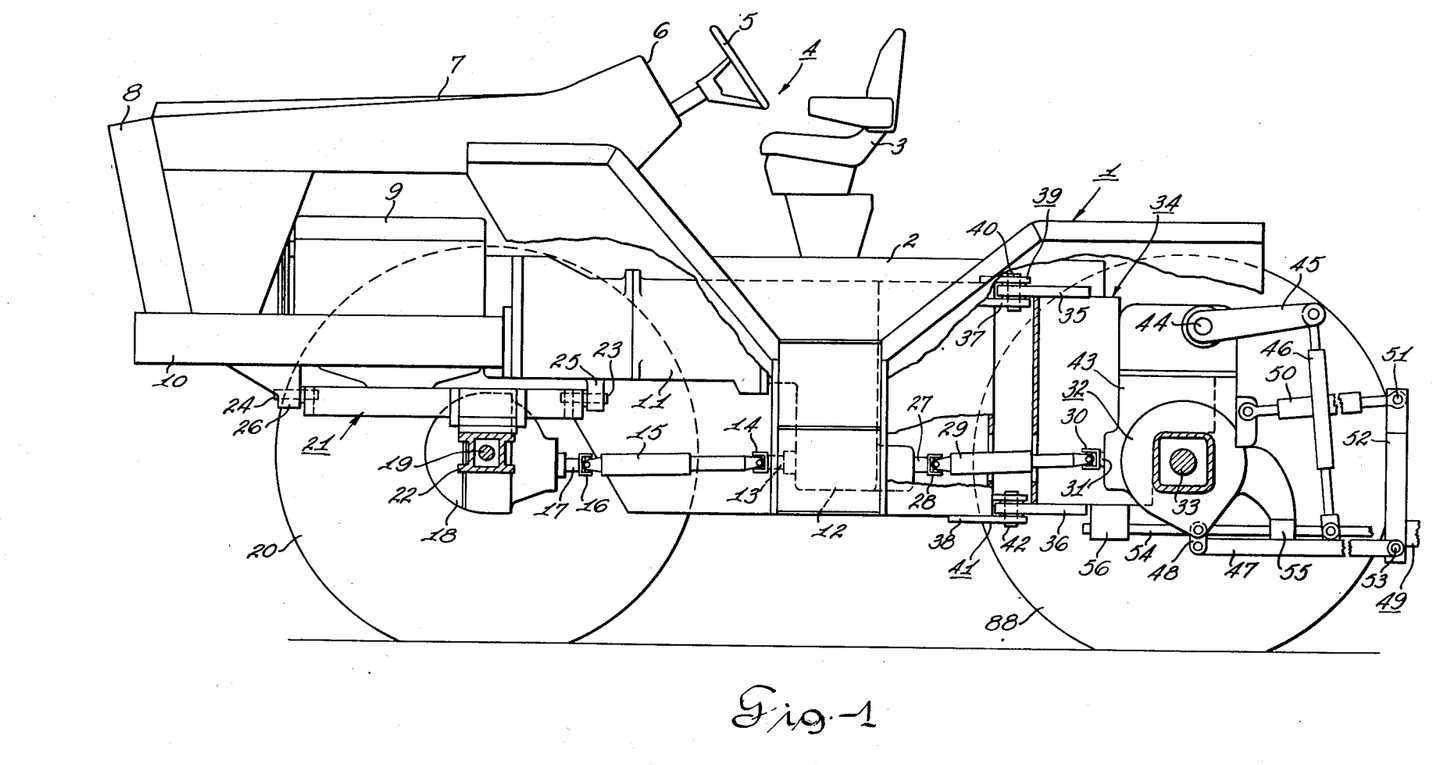
FIG. 1 shows a partially sectioned side view of the vehicle.

Referring to the drawings, FIG. 1 illustrates a partially sectioned side view of the tractor 1. The tractor includes a platform 2 supporting the seat 3 at the operator station 4. The steering wheel 5 is mounted on the control console 6. The engine hood 7 is mounted between the control console 6 and the grill 8 mounted in front of the radiator. The radiator and the grill 8 and engine 9 are mounted on the frame 10 which is a part of the vehicle chassis.

The engine 9 drives through the transmission 11 which drives into the drop box 12. The drop box 12 drives forwardly to the shaft 13, the universal joint 14, the intermediate shaft 15, and universal joint 16. Universal joint 16 drives into the shaft 17 and a differential in the front-wheel drive 18. A front-wheel drive shaft 19 drives one of the front wheels. Front wheels 20 and 70 support the front end of the tractor.

The front-end carriage 21 is connected to the front axle 22 and is pivotally supported on the pins 23 and 24, which in turn are mounted in the brackets 25 and 26 of the front frame end. Accordingly, the front carriage 21 is pivotal on a longitudinal axis of the tractor 1.

The drop box 12 also drives rearwardly through the shaft 27, the universal joint 28 and the intermediate shaft 29 and the universal joint 30. The universal joint 30 drives shaft 31 and through a differential in the rear-axle assembly 32. The rear-drive assembly 32 drives through the rear axle 33 to one of the rear wheels. The rear wheels 88, of which one is shown in FIG. 1, support the rear frame 34. The rear frame 34 includes the brackets 35 and 36 which are pivotally connected to the clevises 37 and 38 on the front frame 10. The upper bearing 39 formed by brackets 35 and clevis 37 is pivotally connected by the pin 40, while the lower bearing assembly 41 formed by bracket 36 and clevis 38 is pivotally connected by the pin 42.

The rear-drive housing 43 pivotally supports the rock shaft 44 and the rock arms 45 are pivotally connected to the lift links 46. A pair of lift links 46 raise and lower the lower draft arms 47 in response to movement of the rock shaft 44. The lower draft arms are connected through arms 88 on the rear-drive assembly to a suitable draft movement-sensing mechanism.

The implement 49 is connected to the upper link 50 by a pivot pin 51. The implement includes a mast 52 which extends downwardly and is connected to the lower draft arms 47 by means of a pivot pin 53. The drawbar 54 is supported by a drawbar bale 55 and the bracket 56 connected to the rear-drive housing 43.

Figure 2:
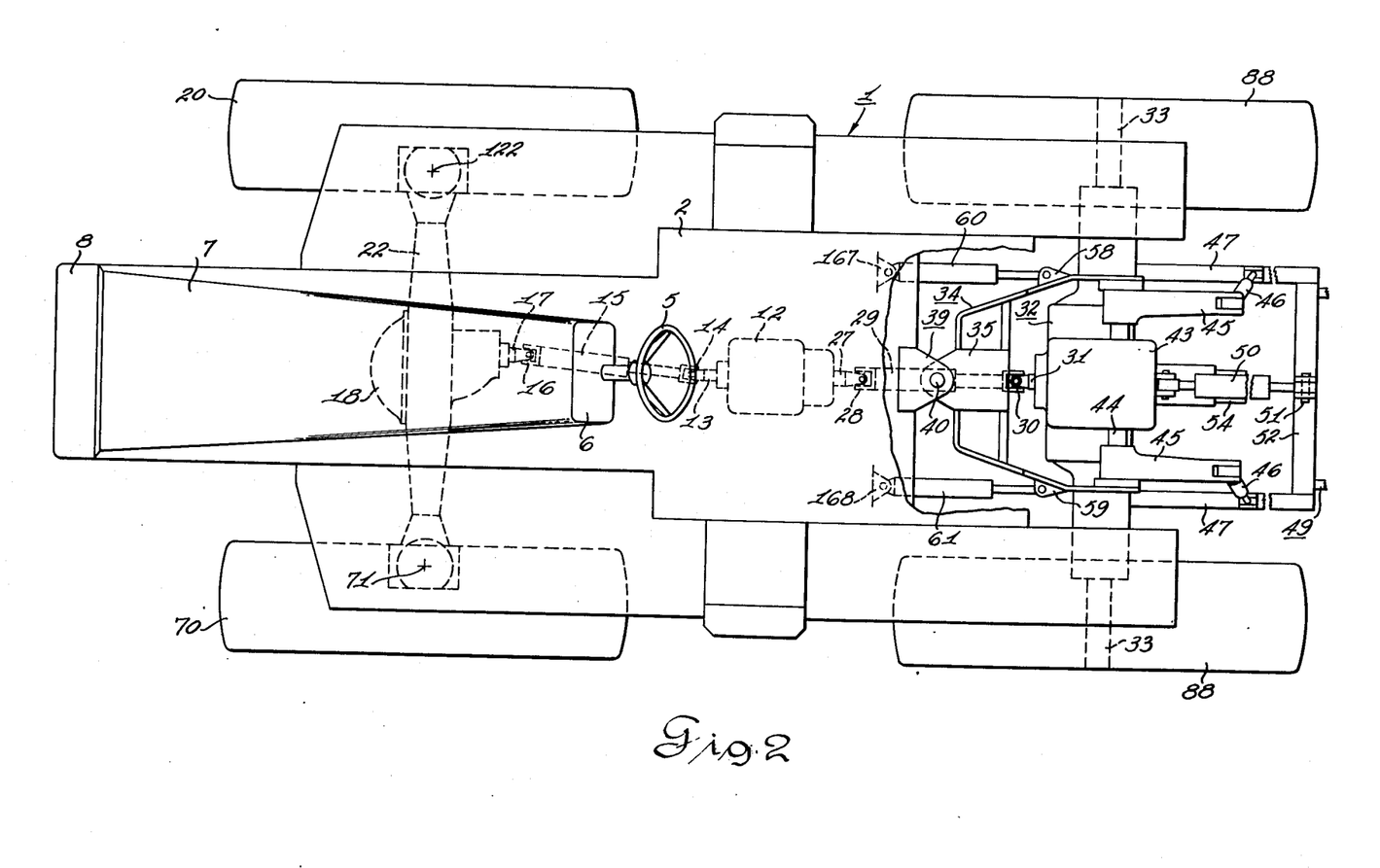
FIG. 2 illustrates a plane view of the vehicle.

In FIG. 2, the articulating bearing 39 is shown which is immediately above the bearing 41. The hydraulic actuators 60 and 61 are supported on the brackets 167 and 168 on the front frame 10 and pivotally connected to the brackets 58 and 59 on the rear frame 34. Selective actuation of the hydraulic actuators 60 and 61 provides articulated steering of the rear wheels 88. This steering mechanism is provided through the hydraulic system shown in FIG. 3.

Figure 7:
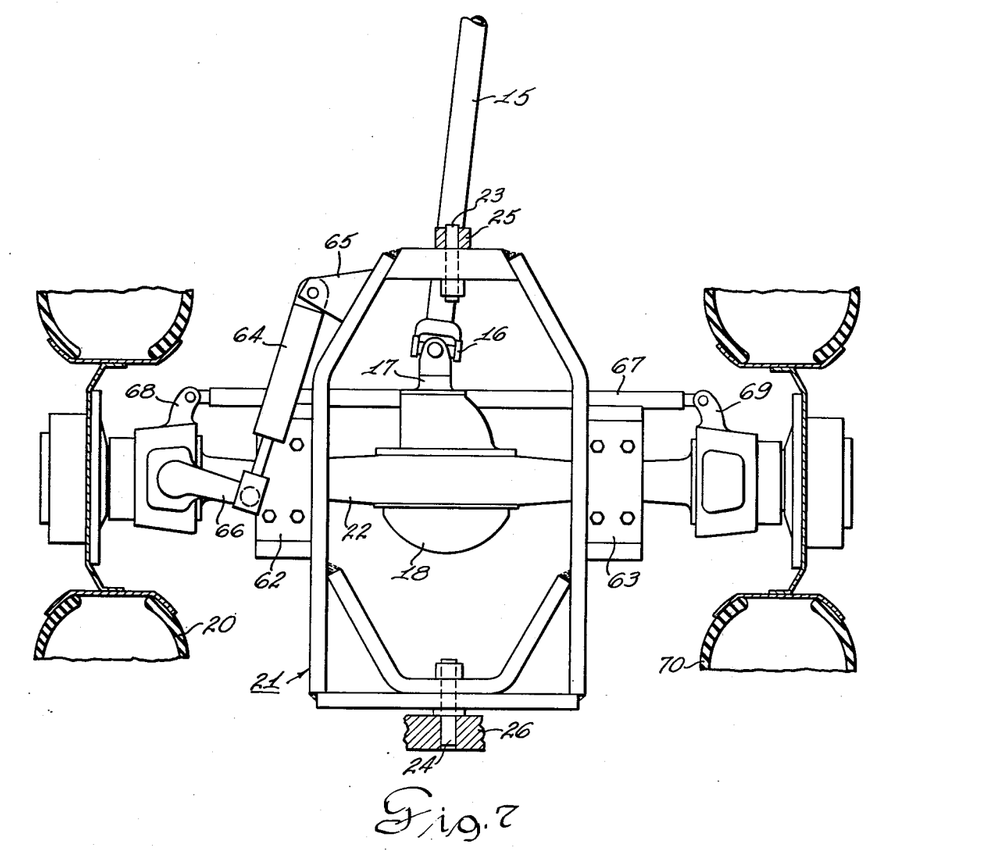
FIG. 7 is a plan view of the front axle and front-end carriage.
Figure 8:
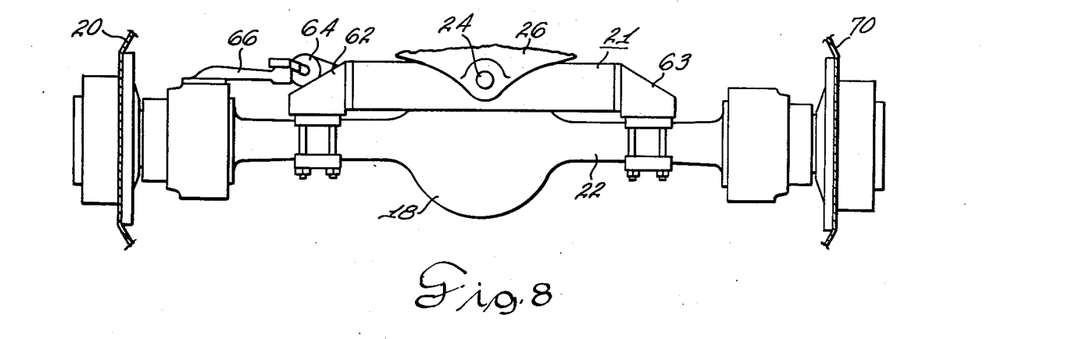
FIG. 8 is a front elevation view of FIG. 7.

FIGS. 7 and 8 show the steering mechanism for the front wheels. The carriage 21 is mounted on the housing of the front-wheel drive 18. The brackets 62 and 63 connect the carriage to the front axle 22. The hydraulic actuator 64 is mounted on the bracket 65 on the carriage 21 and selectively operates the steering arm 66. The steering arm pivots the right-front wheel 20 on its pivotal axis. The tie rod 67 connects the arm 68 with the arm 69 to steer a left-front wheel 70 on its pivotal axis. Accordingly, the front wheels are steered by pivotal movement of the wheels 20 and 70 on their respective pivotal axis.

Figure 3:
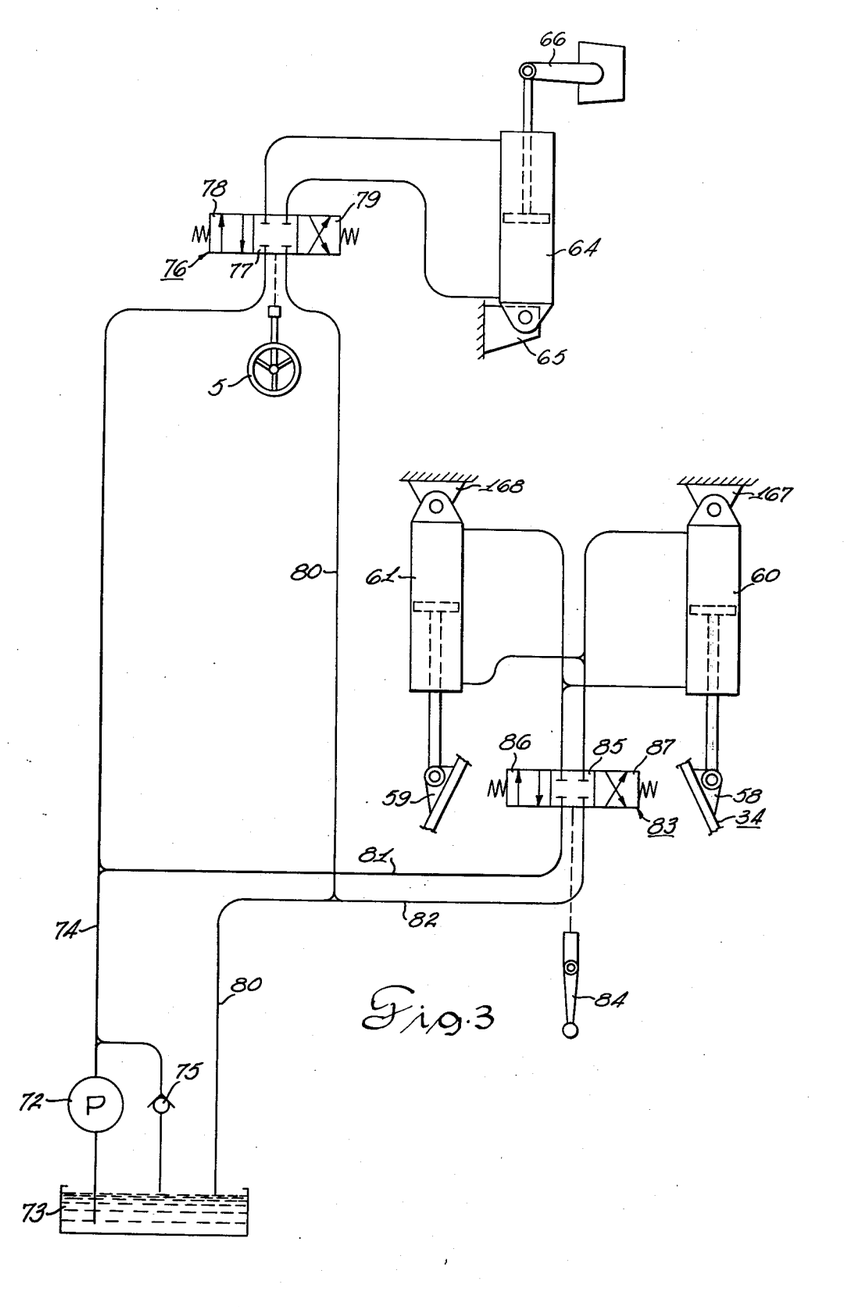
FIG. 3 illustrates a schematic diagram of the hydraulic system for operating the vehicle.

Referring to FIG. 3, the pump 72 receives hydraulic fluid from the reservoir 73 and pressurizes fluid in the hydraulic line 74. A relief valve 75 is connected on the discharge pump 72 to relieve excess fluid pressure in the conduit 74. The hydraulic actuator 64 is connected through the control valve 76. The control valve 76 is controlled by the steering wheel 5. The control valve 76 includes a neutral section 77 as well as a left-turn and right-turn section 78 and 79. Also connected to the high-pressure conduit 74 is conduit 81 which leads to control valves 76 and 83, respectively. The return line 80 is connected to conduit 82 which leads from the control valves 76 and 83 to the reservoir. The control valve 83 controls the articulated steering through the lever 84 which operates the control valve 83 between the neutral position 85 and the right-hand and left-hand turn sections 86 and 87. The articulated steering selectively operates through the hydraulic actuator 60 and 61 to provide articulated steering of the rear frame 34 relative to the front frame 10.

Figure 4:
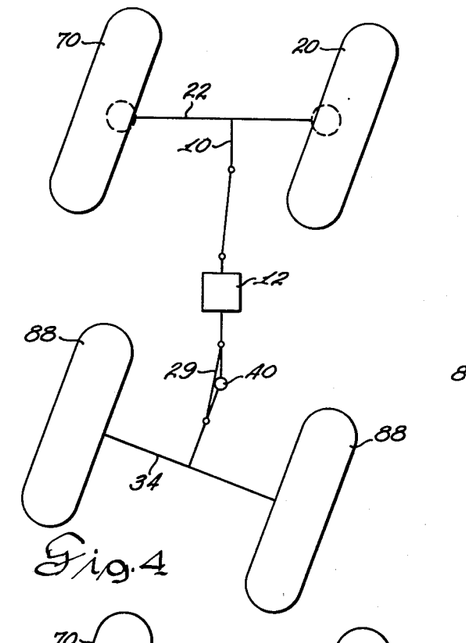
FIG. 4 shows crab steering of the vehicle and the limited angularity of the drive line on the vehicle.

FIG. 4 illustrates the crab steering of the vehicle in which the front wheels 20 and 70 are steering in the right-hand direction while the articulated steering of the rear wheels 88 are steering in the right-hand direction. The drive line 29 to the rear wheels requrs a slight amount of angularity to provide for crab steering.

Figure 5:
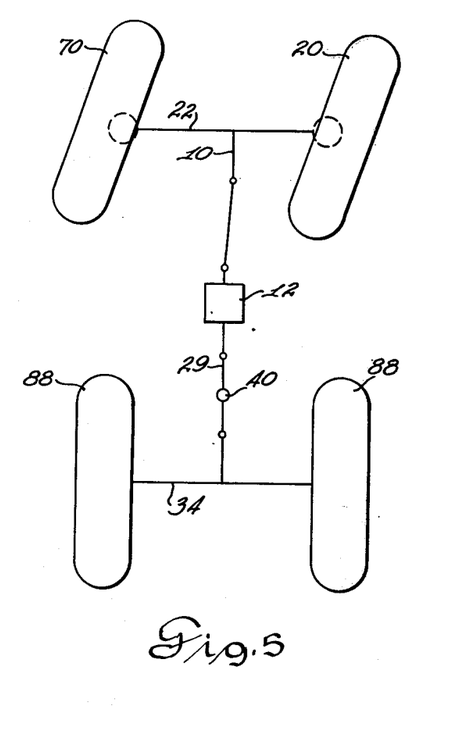
FIG. 5 illustrates front-wheel steering for the vehicle.

FIG. 5 illustrates conventional steering in which the drive line 29 extends in essentially a straight line between the rear frame 34 and the front frame 10 of the chassis. When the vehicle is operated in this manner, it operates as a conventional single-frame chassis in which front-wheel steering is used to control the movement of the vehicle.

Figure 6:
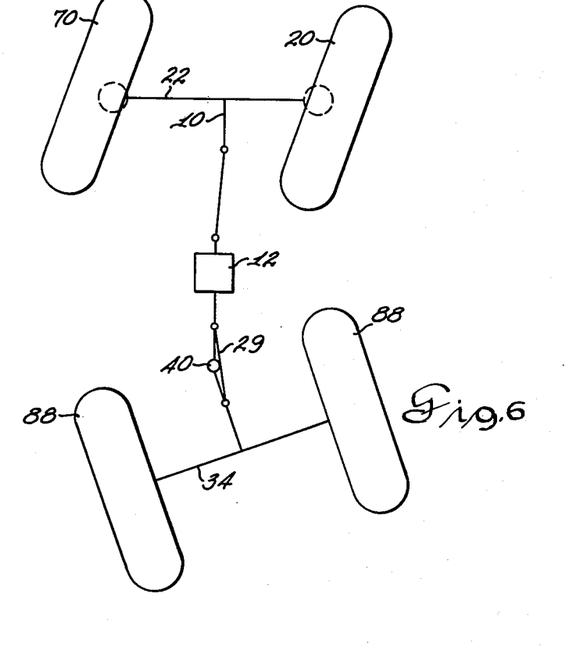
FIG. 6 illustrates front-wheel steering in the right-hand direction and rear-wheel articulated steering in the left-hand direction on the vehicle.

FIG. 6 illustrates steering of the vehicle in which the front wheels 20 and 70 are being steered by the front-steering mechanism in the right-hand direction and the rear-articulated steering provides for steering of the rear wheels in the left-hand direction. In this manner, the vehicle steers with a minimum amount of scuffing of the tires as the rear end of the vehicle is moved in the left-hand direction and the front end of the vehicle is moved in the right-hand direction.

Figure 9:
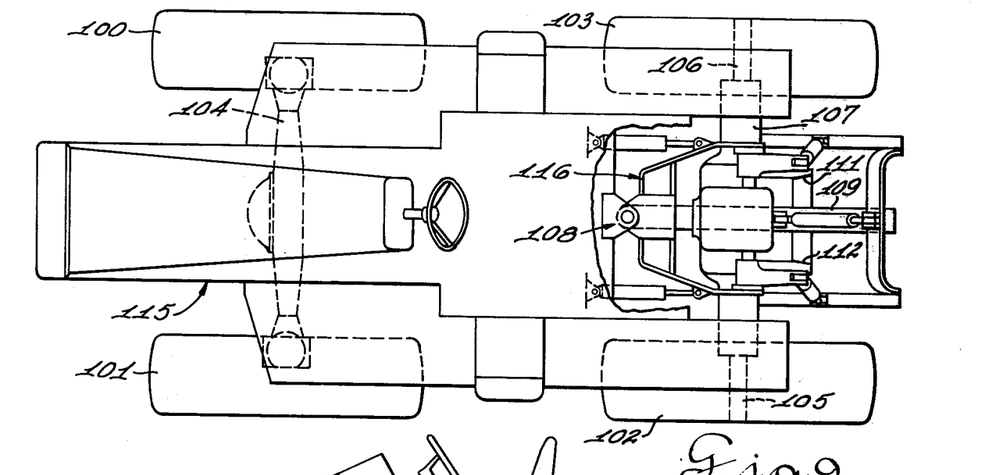
FIG. 9 illustrates a plan view showing the mounting of the drawbar on an axis coincidental with the axis of articulation of the vehicle.
Figures 10, 11, 12, 13:
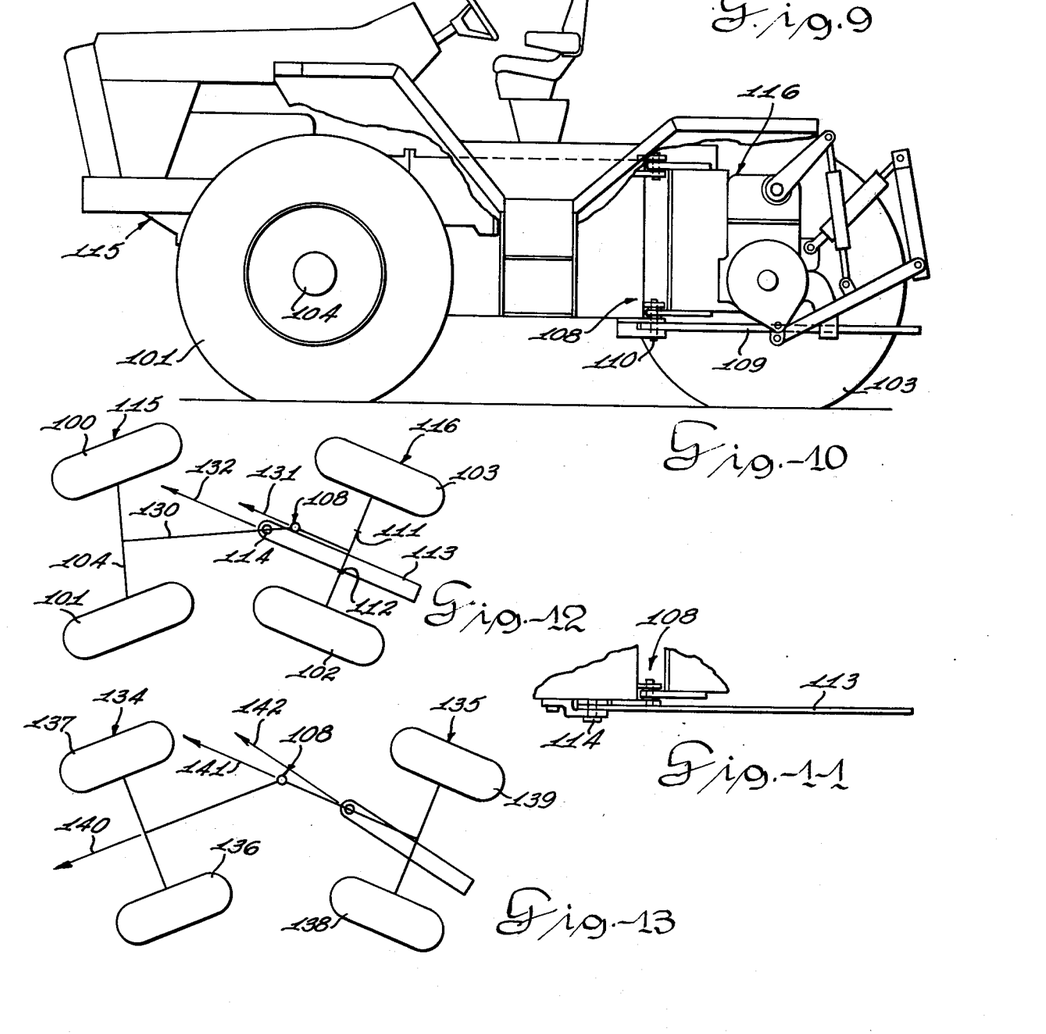

FIG. 9 is a plan view of a four-wheel drive vehicle. A drive mechanism is not shown in detail in this view, but the positioning of the drawbar and its mounting on the vehicle together with the articulating joint is shown. The drive for the vehicle may be similar to that shown in FIGS. 1 and 2 showing a mechanical drive or the drive may be a hydraulic drive suitable for driving the front and rear wheels. Such a system may include one or two pumps which are engine driven and a motor for each of the four wheels for driving the vehicle hydraulically. The vehicle may be used for operating a bulldozer blade or a front-end loader in which the thrust would be through the attachment connected on the front end of the vehicle. The vehicle may also be used as a tractor for pulling of an implement. The coupling between the tractor and the implement may be a three-point hitch or a drawbar as shown in FIGS. 1 and 2. FIGS. 9 and 10 show a modification of the connection of the drawbar and FIG. 11 shows a further modification in connecting the drawbar to the tractor. FIG. 9 shows the four wheels 100, 101, 102 and 103 which drive the vehicle. The front wheels 100 and 101 are rotatably mounted on the front axle 104. A suitable steering arrangement for the front wheels as shown in FIG. 7 is provided to steer the front wheels relative to the front axle. The front axle is also pivotally mounted on a pivoting axis as shown in FIG. 7 whereby the front axle pivots about a longitudinal axis.

The rear wheels 102 and 103 as shown are driven by the rear-drive axle 105 and 106 which are rotatably mounted in the rear-drive assembly 107. The rear wheels 102 and 103 are steered by the articulating mechanism for pivoting at the articulating joint 108.

FIG. 10 illustrates the drawbar 109 which is pivotally mounted on an axis coincidental with the axis of an articulating joint 108. Essentially, the drawbar is connected to the front frame of the vehicle. The drawbar is a swinging drawbar as shown in FIG. 9 and swings on the pivot 110 between the limits defined by the stops 111 and 112 shown in FIG. 9. FIG. 11 shows a modification whereby the drawbar 113 is pivoted on a pin 114 mounted forwardly of the articulating joint 108. The line of draft 132 of the drawbar, projecting forwardly, will pass between the two front wheels 100 and 101 as shown in FIG. 12. The required angle of articulation is substantially less than shown for a vehicle of the type shown in FIG. 13 because the front wheels are steerable on the front axle while the rear wheels are steered by articulation of the vehicle. In this manner, the vehicle can provide crab steering or it can provide right-hand and left-hand steering as well. FIG. 12 shows the vehicle with the front wheels steered to the left and the articulation steering is also steered in a manner to make a left turn as shown.

FIG. 13 shows a conventional articulated vehicle in which the articulating joint is midway between the front axle and the rear axle. It is noted that the angle of articulation is greatly increased when there is no front-wheel steerable wheels and the articulating joint is positioned forwardly compared to the articulated joint shown in the invention covered in this application. It is also clearly shown that the vehicle shown in FIG. 13 is not nearly as stable as the vehicle shown in FIG. 12 and, particularly, when the vehicles shown are turned uphill. With the articulated steering shown in FIG. 13, the interaction between the front and rear wheels reduces the draft load capable of being pulled by the tractor and reduces the efficiency of the tractor. Corrective steering of the vehicle as shown in FIG. 13 may momentarily interrupt or vary the draft loads carried by the vehicle.

The operation of the device will be described in the following paragraphs:

The vehicle shown in FIG. 1 is an articulated vehicle. The articulation of the vehicle is on the bearings 36 and 41. The vehicle is steerable by articulation of the vehicle through the hydraulic actuators 60 and 61 in the hydraulic circuits shown in FIG. 3. The vehicle is also steerable by steering the front wheels 20 and 70 which pivot on their axes in response to operation of the hydraulic actuator 64. The front-end carriage 21 pivots on the pins 23 and 24 to keep the wheels of the vehicle in traction although the terrain is uneven. Traction of the vehicle is provided on all four wheels and the drive to the four wheel is provided through the transmission 11, the drop box 12 and drive means including universal joints.

Since the front wheels are turned by selective operation of the steering wheel 5, it turns the vehicle left or right by selective operation of the section 78 or 79 of the control valve 76. When the articulation of the vehicle is not used, the vehicle is used as a conventional front steerable vehicle. The articulated steering on the rear wheels is accomplished through selective actuation of the hydraulic actuators 60 and 61. The control lever 84 selectively operates the control valve 83 for selective operation of the section 86 or 87 to operate the hydraulic actuators 60 and 61. The rear wheels 88 and the rear frame 34 can be pivoted angularly to the right or left relative to the front frame 10 to provide steering of the vehicle in response to movement of the actuators 60 and 61. The wheels 88 and frame 34 can be pivoted or steered either right or left regardless of the steering direction of the front wheels 20 and 70. Accordingly, to pivot the rear frame and steer the rear wheels of the vehicle in the same direction as the front wheels are being steered will provide crab steering. To steer the rear wheels in the opposite direction from the front wheels will cause the vehicle to turn in the direction of the steering of the front wheels while the rear end of the vehicle moves in the opposite direction and steer the vehicle on a shorter radius than if only the front wheels were used in steering. It is noted that because the front wheels can be steered relative to the front axles, a lesser amount of angularity is required of the drive line between the drop box 12 and the rear drive assembly 32. Because less angularity is required of the drive line components, the drive line should be more reliable and assure longer life of the drive line in the vehicle. The articulating bearings of the vehicle for articulation between the front section 10 and the rear section 34 are located between the rear wheels 88 of the rear section 34. The length of the front frame between the front axle and the articulating joint as compared to the length of the rear frame 34 is approximately 3 to 1. The level of the vehicle is controlled by the two rear wheels 88 and the central pivot of the front-end carriage 21 under the front frame 10. With the positioning of the pivoting axis for articulation of the vehicle rearwardly of the center of the chassis, a more suitable vehicle is provided. The pivotal movement of the carriage 21 and a front axle with the front frame provides for the necessary oscillating movement in response to the unevenness of the terrain.

The operation of the vehicle shown in FIGS. 9, 10, 11 and 12 will be described in the following paragraphs.

The vehicle shown is illustrative only and not limiting. For example, the vehicle shown may be a vehicle of approximately 110-inch wheel base with the front frame measuring 83 inches from the center line of the front axle to the center line of the articulating joint. The rear frame has a frame which measures 27 inches from the articulating joint to the center of the rear axle. Roughly, the ratio of the front frame to the rear frame is 3 to 1. This ratio of articulated vehicle is used with front axles having steerable wheels having essentially a standard turn angle. With a turning radius of approximately that of conventional four-wheel drive tractors, the vehicle covered herein is never put in an unfavorable position as are the center-articulated vehicles. The maximum steering angle of the front wheels and of the articulated steering of the rear wheels is approximately 22 degrees.

When a center-articulated tractor goes into a sharp turn, the pivot joint moves outside the line of pull so that one set of the wheels tends to go straight and the other set off at 44°. FIG. 13 shows the front wheels 136 and 137 at about 44° to the rear wheels 138 and 139. The line of traction 140 is approximately at 44° to the line of propulsion 141. The line of draft 142 is to the right of both the line of propulsion 141 and the line of traction 140. The large angle of articulation reduces the tractive effort since the wheels work in opposition to each other. This interaction consumes extra power without productive work being done. The useful draft component is substantially reduced after side thrust on the implement, interaction of the front and rear bogies, and large angularity between line of traction and the line of propulsion with the line of draft is overcome. Corrective steering constantly varies the effective drawbar pull, this in turn causes the governor of the engine to be constantly hunting to accommodate the variations in the engine output and to provide the relatively constant draft load of the implement.

The vehicle covered herein never has an angle of articulation as large as the center-articulated vehicle. The reduced steering angles and more favorable line of pull improve tractor performance. The tractor pulls straighter on the load and does not create the side thrust on the implement. This, in turn, provides a more efficient and productive tractor.

Since the line of draft of the proposed tractor stays more parallel with the direction of travel, less nonproductive side forces are encountered than with a center-articulated steering tractor. The tractor, as shown, carries a three-point hitch as well as a drawbar. The three-point hitch is connected to the rear bogie 116 which trails the front bogie 115. The longitudinal center line 130 of the front bogie 115 passes through a midpoint in the front axle 104. The line of propulsion 131 of the rear bogie is an imaginary line passing through the center of the rear axle and normal to the rear axle. Accordingly, the line of traction 131 is generally parallel with the line of draft 132.

The center line 130 of the front bogie 115 and the line of propulsion 131 of the rear bogie 116 are theoretically coincidental when the vehicle is traveling in straight ahead. With the drawbar 109 pivotally mounted on the vehicle chassis, the center line of the drawbar defines the line of draft 132 for the vehicle, and this also theoretically is in line with the line of propulsion 131 of the rear bogie 116 and with the line of traction of the front bogie 115 when the vehicle is traveling straight ahead. The implement when connected to the drawbar trails the front bogie 115. The rear bogie 116 provides a propelling force through the articulating joint with the front bogie 115. For small angles of corrective steering, the front wheels alone may provide steering and articulated steering for the rear wheels is unnecessary. Also on hillside work, the rear wheels and front wheels may both be used simultaneously for crab steering and corrective steering and generally keep the vehicle going in the direction desired. Te corrective steering for this vehicle does not require articulation nor produce interacting forces between the front bogie 115 and rear bogie 116 to vary the efficiency of power transmission to the drawbar due to the interaction between the two bogies. Accordingly, this vehicle will provide greater efficiency of power transmission to the drawbar.

FIG. 11 is a modification of FIG. 10 and provides for a drawbar which is pivotally connected forwardly of the articulating joint 108. Positioning of the drawbar forwardly of an articulating joint has some advantage since it produces less angularity between the line of draft and the line of travel of the vehicle. The connection of a drawbar in this manner will provide a line of draft when extended which will always lie between the two front wheels. Accordingly, it can be seen that this vehicle is more maneuverable because the front and rear wheels are steered. Because both front and rear wheels are steered, the vehicle does not have to articulate as much as the vehicle shown in FIG. 13. Because the vehicle does not articulate as much, the stability of the vehicle is improved and this is an important factor, particularly in hilly country. If the center of gravity is shifted outside of the confines of the wheels, the vehicle may become very unstable and even upset if the slope of the hillside is too great. Maximum traction is also provided with the vehicle shown in FIG. 12 since the interaction is reduced to a mininum between the front and rear bogies. Maximum traction provides greater efficiency for the tractor and also a uniform pull on the drawbar for improved operation of the vehicle under all load conditions.

The embodiments of the invention in which are exclusive property or privilege is claimed are defined as follows:

1. A four-wheel drive tractor comprising a chassis including a front frame and rear frame, a drawbar for applying a draft load, means pivotally connecting said drawbar to and carrying the draft load on said front frame of said chassis, an engine supported on the front frame of said chassis, an axle pivotally supporting the front frame of said chassis, front steerable drive wheels rotatably supporting said front axle and pivotal relative to said front axle for front-end steering, front wheel steering mechanism for steering the front wheels, a rear axle supporting said rear frame of said chassis, a pair of rear drive wheels rotatably supporting said rear axle, an articulating joint including vertically spaced pivotal bearings pivotally connecting said front frame which said rear frame of said chassis, an articulating steering mechanism for articulation of said front and rear frames, front wheel manual steering control means for steering said front wheels through said front wheel steering mechanism and rear wheel manual steering control means for steering said rear wheels of said tractor through said articulating steering mechanism, said front frame and said rear frame defining lenght ratios of approximately 3 to 1 with lengths from the center line of the articulating joint to the center line of the front axle relative to the center line of the articulating joint to the center line of the rear axle, means defining an operator station on said front frame of said chassis for operating said tractor.

2. A four-wheel drive tractor as set forth in claim 1 wherein said articulating joint lies rearwardly of the extreme forward portion of said rear drive wheels.

3. A four-wheel drive tractor as set forth in claim 1 wherein said, means pivotally connecting said drawbar to said front frame of said chassis connects said drawbar on an axis coincidental with the axis of said articulating joint.

4. A four-wheel drive tractor as set forth in claim 1 including said drawbar, said means pivotally connecting said drawbar to said front frame being located forwardly of said articulating joint.

5. A four-wheel drive tractor as set forth in claim 1 wherein said drawbar, and said means pivotally connecting said drawbar to said front frame define a line of draft the extension of which lies between the front wheels for all steering conditions of said vehicle.

6. A four-wheel drive tractor as set forth in claim 1 including said drawbar, and said means pivotally connecting said drawbar to said front frame, whereby said drawbar is adapted for connection to an implement for trailing said front frame through the pivotal connection of said drawbar, and said rear frame defines a line of propulsion extending through said articulating joint for propelling said tractor forward.

7. A four-wheel drive tractor as set forth in claim 3 wherein said coupling means includes a three-point hitch on said rear frame for connection to an implement and defining a line of draft essentially through said articulating joint, said rear frame and wheels defining a rear bogie trailing said front frame with said rear bogie defining a line of propulsion projecting through the axis of said articulating joint.

8. A four-wheel drive tractor as set forth in claim 1 wherein said rear frame and said rear wheels define a rear bogie having a line of propulsion driving through the articulating joint of said tractor, lateral stops on said rear bogie limiting the angularity between the line of propulsion of said rear bogie and the line of draft of said drawbar to approximately 20°.

9. A four-wheel drive tractor as set forth in claim 1 wherein said front frame defines a longitudinal center line, said rear frame defines a longitudinal center line, said drawbar defining a line of drawbar defining a line of draft wherein the maximum angularity between either said center lines and said line of draft is less than 25°.

10. A four-wheel drive tractor as set forth in claim 1 wherein, said rear frame defines a line of propulsion driving through the articulating joint of said vehicle, said, means pivotally connecting said drawbar to said front frame being located ahead of said articulating joint to thereby minimize side thrusts on said tractor and provide a relatively constant forward draft on said drawbar.

11. A four-wheel drive tractor as set forth in claim 1 wherein said front frame defines a longitudinal center line, said rear frame defines a line of propulsion normal to the rear axle and driving through said articulating joint, said drawbar defining a line of draft, said means pivotally connecting said drawbar to said front frame being located at said articulating joint, said means for steering for said front wheels and said rear wheels of said tractor providing front wheel steering, articulated chassis steering and crab steering of said tractor for minimizing the angularity between said line of propulsion and the longitudinal center line of said front frame and the line of draft to maintain efficient draft loading on said drawbar.

12. A four-wheel drive tractor as set forth in claim 1 wherein said front steerable drive wheels steer a maximum of approximately 22°, said articulating steering means steer a maximum of approximately 22°.

* * * * *